Patented Mar. 11, 1941

2,234,285

UNITED STATES PATENT OFFICE 2,234,285

TREATMENT OF NATURAL WATERS

William B. Schworm and August V. Graf,
St. Louis, Mo.

No Drawing. Application April 2, 1937,
Serial No. 134,526

4 Claims. (Cl. 210—23)

This invention relates to improvements in treatment of natural waters, and more particularly to improved coagulating processes and coagulants, such as particularly adapted for the treatment of raw or natural waters in municipal purification plants. More particularly stated, the invention involves improved treating processes and materials characterized by a conjoint utilization of two or more materials as flocculating agents, by distinct preference, a combination of either iron or aluminum salts, with a soluble silicate.

The process and materials to be described as characterizing the present invention, are however fully distinguishable from the older somewhat unsatisfactory processes, as preferably involving the addition to the raw water of mixed solutions of a soluble sulfate and a silicate. It is however greatly preferred that the sulfate and silicate be added to the raw water, when employed as a primary coagulant, in a common zone or area. Otherwise expressed, the combination coagulating reagent is introduced to the water under treatment, under conditions which assure the introduction to and their action on the water concurrently or in the same zone. In this manner the invention objectively attains an improved, more complete and a quicker action in the removal of most objectionable minerals and suspended matter.

By way of noting an example and an expression of present preference, the materials employed are referred to as alum or aluminum sulfate as one of the ingredients, and water glass, being soluble or hydrated sodium silicate, as the other. The addition of the aluminum salt to the water glass results in a gelatinous precipitate of variable composition, containing hydrous silica and hydrous aluminum oxide. The mixture of the solutions, if within strengths indicated by the ranges hereinafter referred to, results in a liquid or semi-liquid substance susceptible of utilization and handling through pipe lines, and may for practical purposes be regarded as a fluid for treatment of the natural water. When a mixture of these solutions, or the resultant of their admixture, is applied to raw or natural waters containing, typically, carbonates and bi-carbonates of calcium and magnesium, coagulation takes place much more completely, and at a much more rapid rate, than when the aluminum salt is utilized alone, or separately from the silicate solution.

In the foregoing discussion it is to be understood that the common sulfates of iron, but preferably ferrous sulfate, may be utilized in lieu of the alum, there being but a negligible difference, considered either on a cost basis or on a basis of coagulating completeness or rate, whether ferrous sulfate or the aluminum salt be utilized in combination with the hydrated sodium silicate.

The reaction resulting from the addition to natural waters, of the two solutions or the resultant thereof, serves only to throw down suspended foreign particles such as mud, river slime and earthy material of relatively large average particle size, but also removes with substantial completeness, the suspended or quasi-dissolved matter of such degree of fineness as to render it colloidal, this term being utilized herein in reference to matter of such fine particle size that, with ordinary and prevailing modes of coagulation treatment, its precipitation or separation is extremely difficult. The addition of iron or aluminum salts to water containing colloidal matter, will of course effect a partial removal of the finely divided suspended foreign matter, but it has been determined by repeated turbidity determinations that the removal of this class of substances much more nearly approaches completeness when the coagulant contains or comprises mixtures of the silica with either the iron or aluminum.

The most effective and practical procedure in the application of the mixed solutions or resultant of their mixture, consists in the addition of the sodium silicate solution to the solution of iron or aluminum sulfate. Following thorough mixture of the solutions, the product or resultant is then applied to the water under treatment. It is a preference in the preparation of the sodium silicate solution, to dissolve it in a make-up tank to a strength of, say, four percent by weight of the water. The contents of the make-up tank are then by preference diluted in a second larger make-up or solution tank to result in a silicate solution of something below one percent on a weight basis. The manner of preparation of the aluminum or iron sulfate solution may be in keeping with the prevailing practice of the operator, and need not here be described in detail as the use of alum alone in the treatment of water supplies, is a well known practice.

It has been determined by repeated experiments on typical raw river water containing a relatively high proportion of suspended and colloidal solids, that the most effective ratios of aluminum to silica salts by weight, lie within a range between seven to three, and eight to two; for example, every grain per gallon of treating mixture added to the water would contain in the last case, eight-tenths (.8) grain per gallon of aluminum sulfate, and two-tenths (.2) grain of sodium silicate, per gallon. The range of ratios stated is selected as best exemplifying the process and treatment partly on a basis of costs of materials, and it will be understood that the preferred range of ratios of aluminum to silica as above expressed may be substantially exceeded or diminished, and that the quantity of treating mixture may be varied in accordance with the analysis of the raw or natural water to be treated, as well as in accordance with the required analysis of the treated water. Thus in a river water containing, for example, a very high proportion of suspended solids, a somewhat larger quantity of the treating mixture would be employed than in the case of a water characterized by an initial much lower turbidity. Since, obviously, the mode of treatment described is extremely effective either in the primary coagulation of raw waters, or in a secondary coagulation treatment thereof, the quantity of treating mixture to be added would ordinarily vary in these two instances, as might also the ratio between the aluminum and silica in the treating mixtures.

It has been determined experimentally that although the proportion of silica to aluminum may be increased beyond the ranges heretofore expressed as a preference, that as the treating mixture approaches, in ratio, an entirety of silica, the coagulating rate and effect are diminished. It is evident that the use of silica alone, without the aluminum or ferrous salt, is scarcely effective; it will further be noted that the use of silica in much greater proportions than in the range of ratios indicated, will not be enough more effective to be warranted. Nevertheless the use of silica in any appreciable quantity in combination with the aluminum or iron salt is pro tanto more effective than the use of either the iron or aluminum salt alone. Thus there may be stated as a practical useful limit, an aluminum to silica ratio of ten to one, wherein each grain per gallon of added treating mixture would contain ten-elevenths grain of aluminum sulfate, and one-eleventh grain sodium silicate.

The manner of adapting the described process for utilization in existing municipal water treating plants will vary somewhat with the arrangement of basins, sedimentation tanks, piping and pumping equipment in such plants, but it is obvious that the materials used in the process may be prepared in the usual coagulation house, and may be added to the water, usually after the water from the rising well is conducted into the pre-sedimentation basins. It is a preference that lime be added in accordance with the prevailing practice as a preliminary softening reagent, as in a rapid mixing conduit. Following the complete, prevailing lime treatment, the described mixture of treating solutions may be added to the water in the circular reaction chambers, preferably under conditions of turbulence so as to result in a quick and effective primary coagulation in the basins beyond the circular reaction chambers. From the primary coagulation basins, the water is conducted into separate sedimentation basins, and after a suitable period of time for settling, is conducted to a second rapid mixing conduit wherein the mixture of treating solutions, if employed in a second stage, is preferably added prior to a final or further sedimentation treatment. From the latter the water is preferably conducted through any other desired stages or processes of treatment; for example, chlorination or carbonation, thence to the filter plant, whence it may be pumped to the supply mains for utilization. It is to be understood of course that the exact order of some of the steps outlined is not material, and that some thereof may be omitted, dependent upon the characteristics of the raw water and required specification of the fully treated water.

In summarizing the improved results obtained through the use of the process and technique described, it may be noted that the water as initially subjected to the aluminum and silica treatment, will usually be slightly alkaline by reason of the preferred primary softening treatment with CaO, but it is further to be understood that the alkalinity of the water following this treatment, does not vary greatly in value from water treated with aluminum or iron sulfate alone. There may be in some instances a slight but unimportant increase in dissolved silica incident to the use of the sodium-silica combination as a coagulant, in comparison with the use of alum alone. In any case, however, unless a needless excess of the treating material be employed, the very slight increase, if any, in dissolved silica in the finished water, compared to the older process, is not objectionable. It is to be noted that there results some reduction in the silica originally dissolved in the water incident to the purification process, whereby the net change in silica content in water supplied to the consumers is never more than a negligible increase.

It has been determined that the use of silica with the aluminum or iron sulfate as described, results in a somewhat softer water, that is a water characterized by less non-carbonate hardness. This results from the fact that the use of the alum or iron alone, slightly increases the non-carbonate hardness of the water by leaving sulfates in solution, which it is impossible to precipitate without resorting to an additional treatment with soda ash or the like. The latter is a relatively expensive process, and is not generally utilized in the larger purification plants. It will have appeared that less of the aluminum-silica mixture is required to produce the same efficiency in the reduction of hardness, in comparison with the amount of aluminum alone, from which is noted the net result that less sulfate is left in solution in the treated water supply, and consequently there results a somewhat softer water.

Although the invention has been described by making specific reference to certain definite substances preferably utilized in the preparation of the coagulant mixture, other equivalent materials may be employed, distinctly within the scope and purview of the invention. It is further mentioned that the exact order of the steps embodying the method or process may be substantially varied without departing from the full intended spirit and scope of the invention as defined by the claims hereunto appended.

We claim as our invention:

1. In a process of water purification the step which comprises coagulating the impurities in the water by treatment with a combination of a soluble sulphate and a substantial quantity of an alkali metal silicate in minor proportion, the soluble sulphate being selected from a group consisting of iron and aluminum sulphates, wherein a prepared composition consisting of a mixture of the solutions of the sulphate and silicate without additional acid is added to the water to be treated.

2. A composition of matter for the chemical clarification and softening of natural waters consisting of the product resulting from the admixture of solutions of a soluble sulphate selected from a group consisting of aluminum and iron sulphates, and a substantial quantity of an alkali metal silicate in minor proportion, without the addition of acid for neutralizing the silicate.

3. A composition of matter as set forth in claim 2, wherein the ratio of solids in the admixture is of the order including limits of 7 to 3 and 8 to 2 respectively of the sulphate to the silicate.

4. A composition of matter as set forth in claim 2, wherein the quantity of silicate is at least $1/11$ of the total added solids.

WILLIAM B. SCHWORM.
AUGUST V. GRAF.